US 11,353,931 B2

(12) United States Patent
Hsu (10) Patent No.: US 11,353,931 B2
(45) Date of Patent: Jun. 7, 2022

(54) HINGE DEVICE FOR A FOLDABLE DEVICE

(71) Applicant: Jarllytec Co.,Ltd., New Taipei (TW)

(72) Inventor: Yu-Tsun Hsu, New Taipei (TW)

(73) Assignee: JARLLY TEC CO., LTD., New Taipei (TW)

( * ) Notice: Subject to any disclaimer, the term of this patent is extended or adjusted under 35 U.S.C. 154(b) by 218 days.

(21) Appl. No.: 16/738,905

(22) Filed: Jan. 9, 2020

(65) Prior Publication Data

US 2020/0409427 A1 Dec. 31, 2020

(30) Foreign Application Priority Data

Jun. 27, 2019 (TW) .................................. 108122618

(51) Int. Cl.
| | | |
|---|---|---|
| *E05D 11/08* | (2006.01) | |
| *G06F 1/16* | (2006.01) | |
| *E05D 1/04* | (2006.01) | |
| *F16C 11/04* | (2006.01) | |

(52) U.S. Cl.
CPC ............. *G06F 1/1681* (2013.01); *E05D 1/04* (2013.01); *E05D 11/082* (2013.01); *F16C 11/04* (2013.01); *G06F 1/1652* (2013.01); *E05Y 2900/606* (2013.01); *G06F 1/1616* (2013.01)

(58) Field of Classification Search
CPC ....... E05D 11/082; E05D 1/04; G06F 1/1681; G06F 1/1652; F16C 11/04
See application file for complete search history.

(56) References Cited

U.S. PATENT DOCUMENTS

| | | | | |
|---|---|---|---|---|
| 7,488,300 B2* | 2/2009 | Houser | ................. | A61F 5/0123 16/325 |
| 8,640,306 B2* | 2/2014 | Hirota | ................. | E05D 11/1078 16/334 |
| 8,899,537 B2* | 12/2014 | Kuan | ................... | F16M 13/022 248/222.52 |
| 9,864,415 B2* | 1/2018 | Siddiqui | ............... | G06F 1/1681 |
| 10,303,207 B2* | 5/2019 | Yang | ......................... | E05D 7/00 |
| 10,664,021 B1* | 5/2020 | Hsu | ....................... | H04B 1/3888 |
| 11,009,061 B2* | 5/2021 | Chang | ....................... | E05D 3/18 |
| 11,016,541 B2* | 5/2021 | Lin | ........................ | E05D 3/122 |

(Continued)

FOREIGN PATENT DOCUMENTS

CN 108315684 A 7/2018
CN 109488681 A 3/2019

*Primary Examiner* — Jason W San
(74) *Attorney, Agent, or Firm* — Muncy, Geissler, Olds & Lowe, P.C.

(57) ABSTRACT

The present invention provides a hinge module for a foldable device. A first curved guiding portion and a second curved guiding portion are provided between two sides of a curved body, and a first connecting portion of a first rotating member is connected with a first support plate. At least one of the first curved blocks of the first rotating member is swingable and limited within the first curved guiding portion. A second connecting portion of a second rotating member is connected with a second support plate. At least one of the second curved blocks of the second rotating member is swingable and limited within the second curved guiding portion. A first linkage assembly has one end pivotally connected with one side of the first curved block. A second linking member is provided at another end of the two linkage assemblies.

15 Claims, 9 Drawing Sheets

(56) References Cited

U.S. PATENT DOCUMENTS

| | | | |
|---|---|---|---|
| 2012/0110785 A1* | 5/2012 | Hanigan | E05D 3/10 16/367 |
| 2015/0362956 A1* | 12/2015 | Tazbaz | G06F 1/1618 361/679.27 |
| 2016/0097227 A1* | 4/2016 | Hsu | F16B 1/00 16/354 |
| 2017/0003719 A1* | 1/2017 | Siddiqui | E05D 11/082 |
| 2017/0023985 A1* | 1/2017 | Xin | G06F 1/1637 |
| 2017/0208703 A1* | 7/2017 | Lin | H05K 7/16 |
| 2018/0113491 A1* | 4/2018 | Park | G06F 1/1679 |
| 2018/0364755 A1* | 12/2018 | Yang | E05D 7/00 |
| 2019/0011957 A1* | 1/2019 | Wendt | F16M 13/005 |
| 2019/0033925 A1* | 1/2019 | Hong | G06F 1/1681 |
| 2019/0094917 A1* | 3/2019 | Schmelzle | E05D 11/0054 |
| 2019/0390703 A1* | 12/2019 | Hsu | E05D 11/082 |
| 2020/0019219 A1* | 1/2020 | Palmer | H04R 7/24 |
| 2020/0103935 A1* | 4/2020 | Hsu | G06F 1/1681 |
| 2020/0352044 A1* | 11/2020 | Hsu | G06F 1/1641 |
| 2020/0363843 A1* | 11/2020 | Cheng | G06F 1/1652 |
| 2020/0371553 A1* | 11/2020 | Hsu | G06F 1/1652 |
| 2020/0371561 A1* | 11/2020 | Lin | G06F 1/1681 |
| 2020/0383217 A1* | 12/2020 | Kim | E05D 3/122 |
| 2021/0373611 A1* | 12/2021 | Lee | H04M 1/0216 |

* cited by examiner

Fig. 10

HINGE DEVICE FOR A FOLDABLE DEVICE

FIELD OF THE INVENTION

The present invention is related to a hinge, and particularly to a hinge module of a foldable electronic device.

BACKGROUND OF THE INVENTION

In general for electronic devices, in terms of conventional foldable devices, a display and a base of a notebook computer, are mainly connected with each other through a single folio type hinge that is respectively connected with the side of the display and the base to form a pivoting connection, thereby making the display folded or unfolded in an reverse direction relative to the base. In recent years, there are foldable devices of which conventional displays and bases are replaced by at least two bodies for being used together with a flexible display. For example, Chinese Patent entitled with "a hinge module for the foldable device" with application number No. CN201810371007.2 (referring to Citation 1), Citation 1 has disclosed that in an embodiment of Citation 1, Citation 1 mainly includes a first support member, a folio type hinge, a second support member, a multi-axis shaft, and a third support member for being used together with a flexible display, thereby after the flexible display is folded to be in an S-shape or a Z-shape, the first support member and the second support member interconnected by the folio type hinge can be closed through "a single virtual rotation center", and an accommodating space is formed inside the folio type hinge to accommodate a curved portion of the flexible display.

For the subsequent improvement, such as the Chinese Patent entitled with "a hinge module for the foldable device" with application number no. CN109488681A (referring to Citation 2), it further includes technical features of "a cover plate together with a swinging member", such that during the overall folding and unfolding process, a free swinging effect similar to a seesaw can be generated. When the device of Citation 2 is folded, an accommodating space can be formed to accommodate the curved middle portion of the flexible display, and when the device of Citation 2 is unfolded, the flattened middle portion of the flexible display can be stably supported.

The "single virtual rotation center" used in Citation 1 or the "shaft-free seesaw" used in Citation 2 all requires that the curved portion of the flexible display should have a small curvature after the two bodies of the foldable device are folded, thereby making the overall structure thinner. However, there are differences in respect of the current technological development among various display manufacturers, that is, not all flexible displays will have a small curvature in their curved parts, or they might have different curved patterns under small curvatures. Therefore, for those flexible displays with different curved patterns, a corresponding appropriate hinge module is required instead of adopting the structural designs of Citation 1 and Citation 2, so as to reduce damages made to the flexible display. In view of this, in order to provide a structure different from prior art and to improve the above disadvantages, the inventor has continuously researched, so as to provide the present invention.

SUMMARY OF THE INVENTION

One object of the present invention is to provide a hinge module for a foldable device, which can simplify the operation of the hinge module of the previous Citations 1 or 2, and changes the "single virtual rotation center" of Citation 1 to "dual virtual rotation centers", and the compensation operation produced by the shaft-free seesaw like structure is replaced with "two rotating members to rotate synchronously with respect to the curved body". In addition, the "shaft-free seesaw" structure in Citation 2 and its compensation operation are further removed, and the overall thickness is reduced to improve overall designs, so as to meet the market demand of being lighter and thinner to promote sales, and the service life of the existing flexible display is thus prolonged under the limitations of the small curvature of the existing flexible display when the existing flexible display is folded.

In order to fulfill the object of the present invention, the hinge device for a foldable device comprises a curved body, a first rotating member, a second rotating member, and a first linkage assembly and a second linkage assembly. The curved body has two lateral surfaces that are oppositely provided, where a first curved guiding portion and a second curved guiding portion are juxtaposed and spaced from each other between the two lateral surfaces. The first rotating member includes a first connecting portion and at least one first curved block, where the first connecting portion is connected with a first support plate; the at least one first curved block is swingable and limited within the first curved guiding portion. The second rotating member includes a second connecting portion and at least one second curved block, where the second connecting portion is connected with a second support plate, and the at least one second curved block is swingable and limited within the second curved guiding portion. The first linkage assembly has one end pivotally connected with one side of the first curved block of the first rotating member, and another end of the first linkage assembly being provided with a first linkage member. The second linkage assembly has one end pivotally connected with one side of the second curved block of the second rotating member, and another end of the second linkage assembly is provided with a second linkage member, where the second linkage member is movably connected with the first linkage member in a reverse direction.

In an implementation, the first curved guiding portion of the curved body includes two first curved grooves that are juxtaposed and spaced from each other, and the first rotating member has two first curved blocks that are juxtaposed and spaced from each other, and the two first curved blocks are swingable and limited within the two first curved grooves.

In an implementation, a first track is further provided between the two first curved grooves of the curved body, and a first connecting-lever assembly is further provided between the two first curved blocks of the first rotating member; the first connecting-lever assembly includes a first sliding block and two first torsion bars, and the first sliding block is connected with the first track; each of two first torsion bars has one end pivotally connected with one side of one first curved block, and another end pivotally connected with both sides of the first sliding block, such that the first rotating member is rotated to drive the first sliding block to be moved on the first track.

In an implementation, the curved body is further provided with a first accommodating space, and the first accommodating space is for accommodating a first elastic member; one end of the first elastic member is pressed against a first positioning ball; the first positioning ball is pressed against the first curved block for positioning the first rotating member at a preset angle.

In an implementation, the first curved block is a curved frame including two first lateral plates and a first curved plate respectively connected with the two first lateral plates; at least one first positioning groove is provided on an inner curved surface of the first curved plate for positioning the first positioning ball.

In an implementation, the second curved guiding portion of the curved body includes two second curved grooves that are juxtaposed and spaced from each other, and the second rotating member has two second curved blocks that are juxtaposed and spaced from each other, and the two second curved blocks are respectively swingable and limited within the two second curved grooves.

In an implementation, a second track is further provided between the two second curved grooves of the curved body, and a second connecting-lever assembly is further provided between the two second curved blocks of the second rotating member; the second connecting-lever assembly includes a second sliding block and two second torsion bars, and the second sliding block is connected with the second track; each of the two second torsion bars has one end pivotally connected with one side of one second curved block, and each of the two second torsion bars has another end pivotally connected with both sides of the second sliding block, such that the second rotating member is rotated to drive the second sliding block to be moved on the second track.

In an implementation, the curved body is further provided with a second accommodating space, and the second accommodating space is for accommodating a second elastic member; one end of the second elastic member is pressed against a second positioning ball; the second positioning ball is pressed against the second curved block for positioning the second rotating member at a preset angle.

In an implementation, the second curved block is a curved frame including two second lateral plates and a second curved plate respectively connected with the two second lateral plates; at least one second positioning groove is provided on an inner curved surface of the second curved plate for positioning the second positioning ball.

In an implementation, a gear is further provided between the first curved guiding portion and the second curved guiding portion of the curved body; the first linkage assembly includes a first torsion member and a first linkage member; one end of the first torsion member is pivotally connected with one side of the first curved block of the first rotating member, and another end of the first torsion member is pivotally connected with the first linkage member; the first linkage member is a rack, and the first linkage member is engaged with the gear; the second linkage assembly includes a second torsion member and a second linkage member; one end of the second torsion member is pivotally connected with one side of the second curved block of the second rotating member, and another end of the second torsion member is pivotally connected with the second linkage member; the second linkage member is a rack, and the second linkage member is engaged with the gear.

In an implementation, the first torsion member and second torsion member are respectively formed by stacking a plurality of torsion pieces.

In an implementation, the curved body is further provided with a third track, and the first linkage member is further provided with a first guiding rail, and the first guiding rail is connected with the third track, such that the first rotating member is rotated to drive the first guiding rail to be movable on the third track.

In an implementation, the curved body is further provided with a fourth track, and the second linkage member is further provided with a second guiding rail, and the second guiding rail is connected with the fourth track, such that the second rotating member is rotated to drive the second guiding rail to be movable on the fourth track.

In an implementation, the first torsion bar and second torsion bar are respectively formed by stacking a plurality of torsion pieces.

The present invention will be understood more fully by reference to the detailed description of the drawings and the preferred embodiments below. In order to deeply understand the present invention, the embodiments of the present invention are described below.

DETAILED DESCRIPTIONS OF PREFERRED EMBODIMENTS

Figure 1:
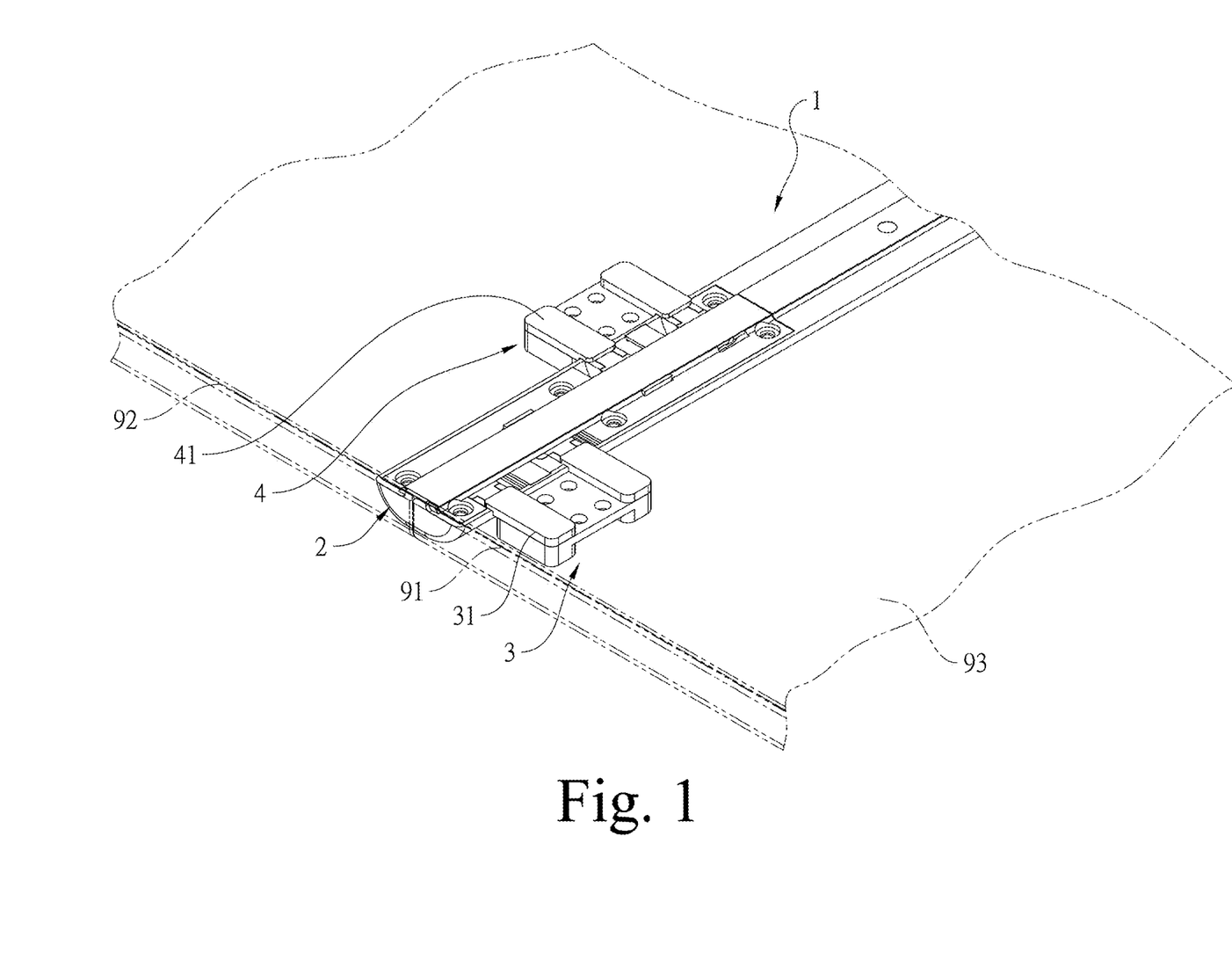
FIG. 1 is a schematic view of a three-dimensional appearance of a preferred embodiment of the present invention.
Figure 10:
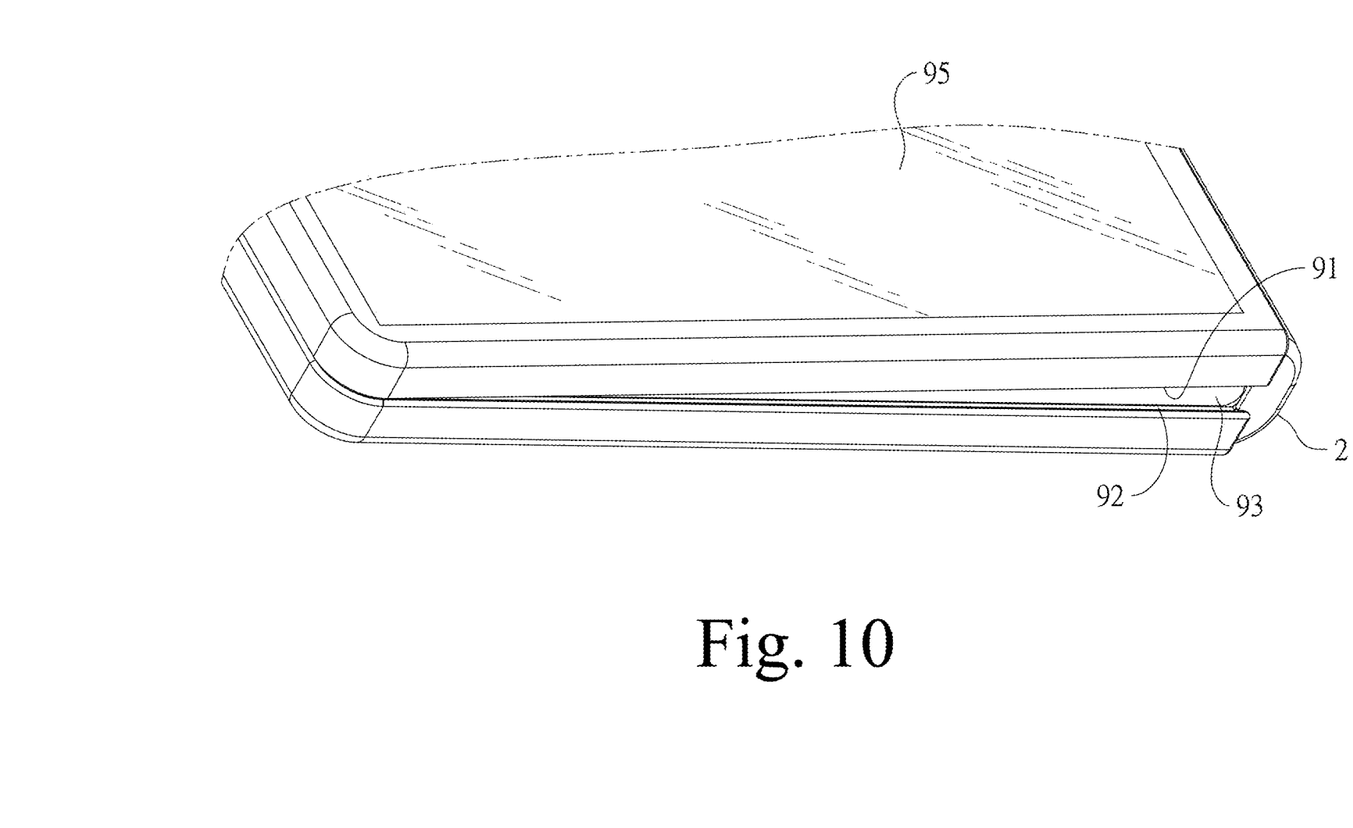
FIG. 10 is a schematic view of the appearance of the electronic device when it is folded according to a preferred embodiment of the present invention.

Please refer to FIG. 1, which is a preferred embodiment of the hinge module 1 for a foldable device of the present invention. The first connecting portion 31 of the first rotating member 3 is connected with one side of a first support plate 91 of a body (for example, a display) of an electronic device. A second connecting portion 41 of a second rotating member 4 is connected with one side of a second support plate 92 of another body (for example, a base) of the electronic device; the first support plate 91 and the second support plate 92 are both connected with a flexible display 93, such that when the first rotating member 3 and the second rotating member 4 are respectively rotated around a curved body 2 as an axis, the two bodies (for example, the display and the base) is rotated in a reverse direction to fold the flexible display 93. As shown in FIG. 10, the outside of the body where the first support plate 91 is located can further be provided with a second display 95. When the entire structure is folded, the second display 95 can display information or perform touch operations. In addition, two touch displays can be respectively connected with the first support plate 91 and the second support plate 92 that are juxtaposed to replace the implement of the flexible display 93. Then, the first connecting portion 31 of the first rotating member 3 and the second connecting portion 41 of the second rotating member 4 are respectively connected with one side of two supporting plates that are juxtaposed, that is, the hinge module of the present invention can be applied to a foldable (electronic) device with a dual touch displays.

Please refer to FIG. 2 to FIG. 6, which are preferred embodiments of the hinge module 1 of the foldable device of the present invention including a curved body 2, a first rotating member 3, a second rotating member 4, a first linkage assembly 5, and a second linkage assembly 6.

Figure 2:
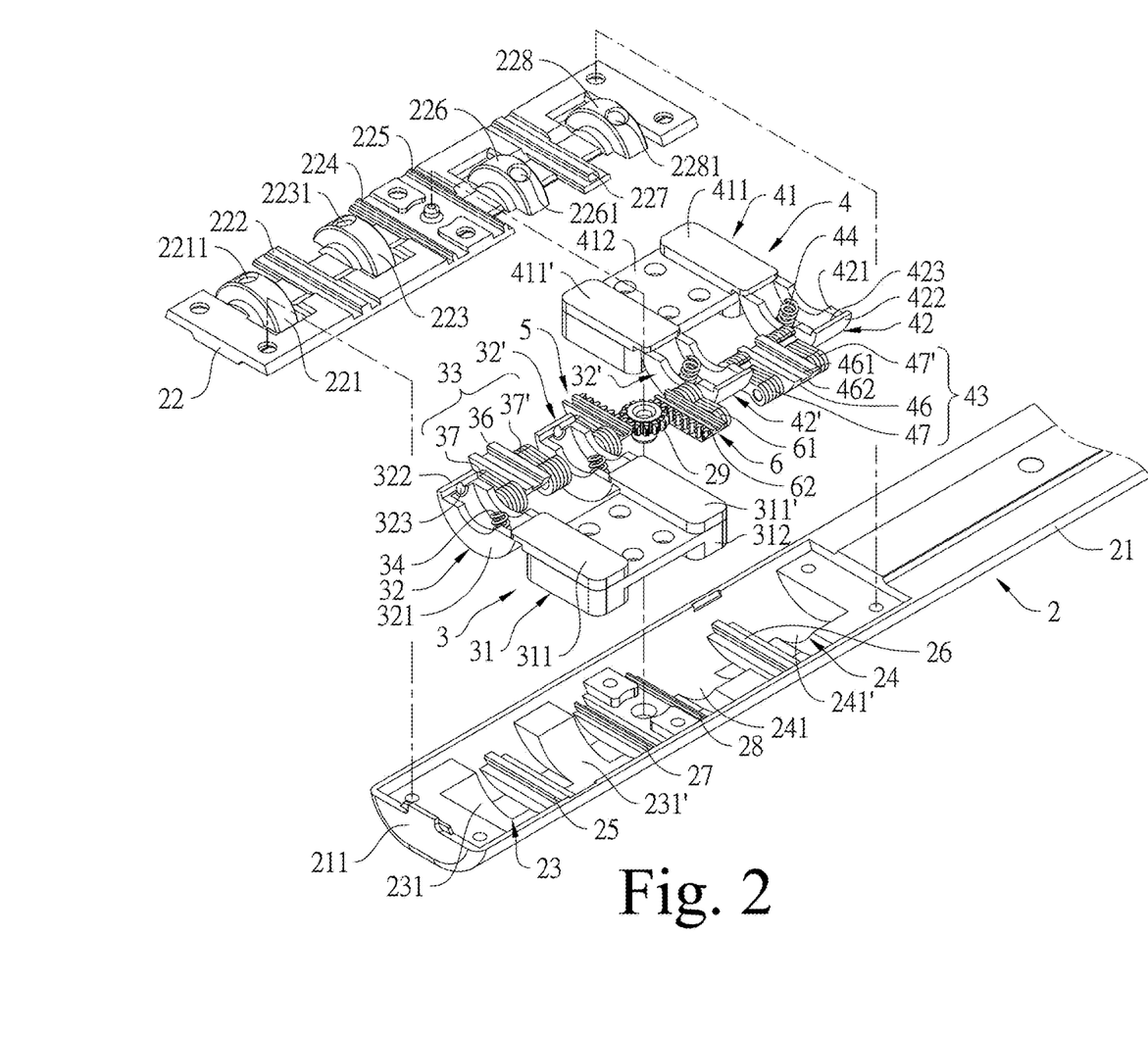
FIG. 2 is an exploded view of the components of the preferred embodiment of the present invention.
Figure 3:
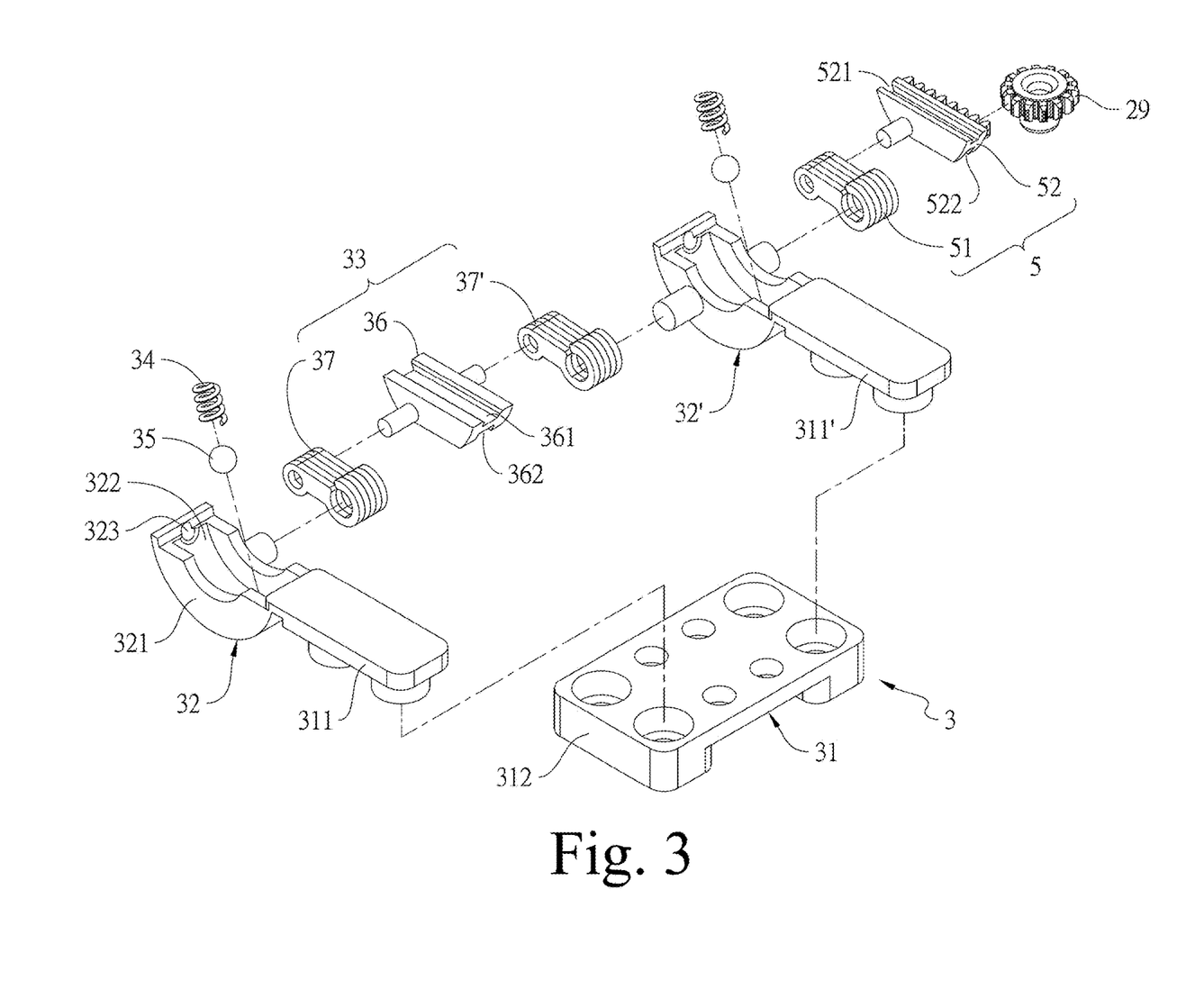
FIG. 3 is an exploded view of part of components of the preferred embodiment of the present invention.
Figure 4:
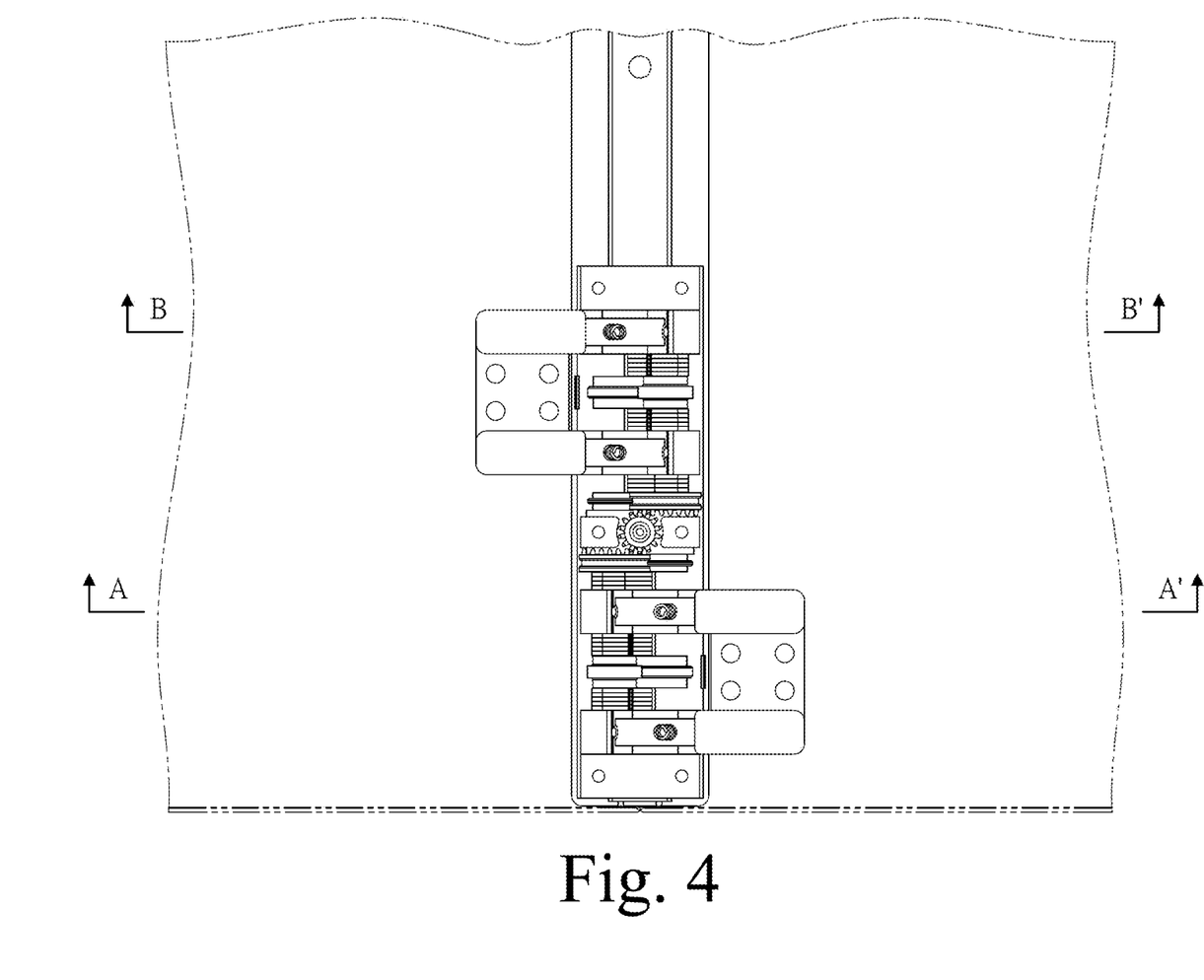
FIG. 4 is a top view of a preferred embodiment of the present invention.
Figure 5:
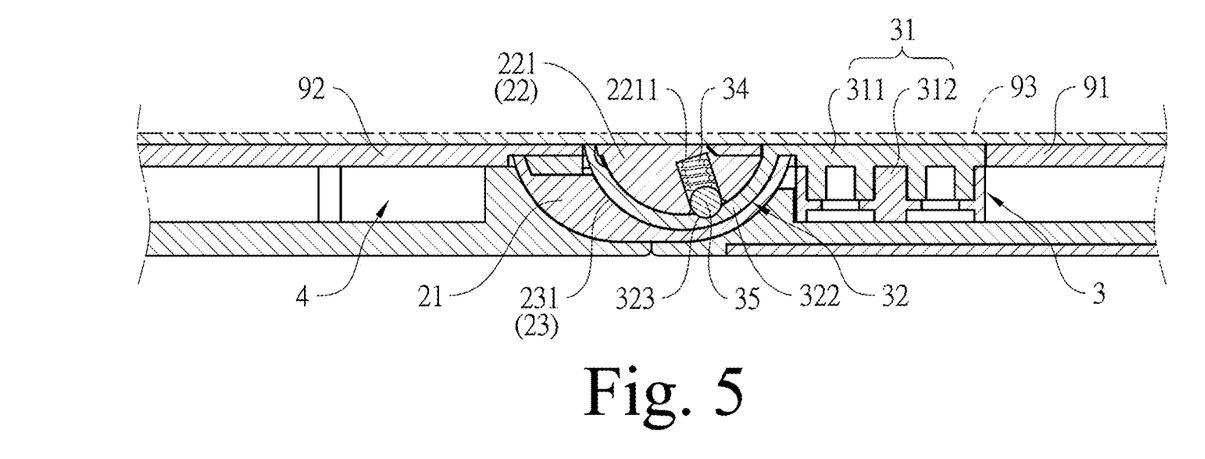
FIG. 5 is a sectional view taken along the line A-A' in FIG. 4.
Figure 6:
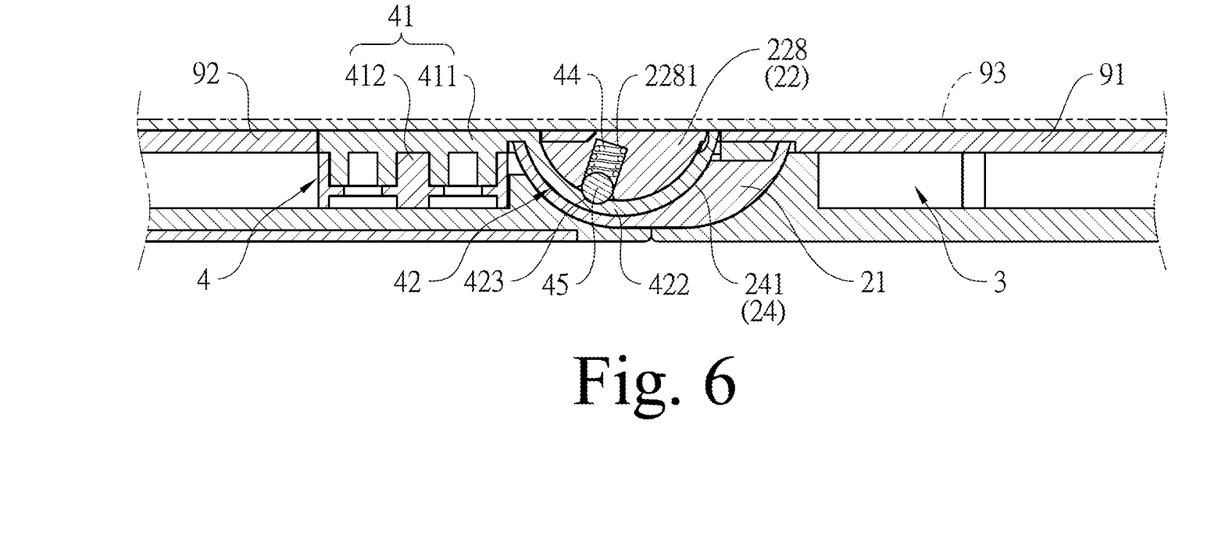
FIG. 6 is a sectional view taken along the line B-B' in FIG. 4.
Figure 7:
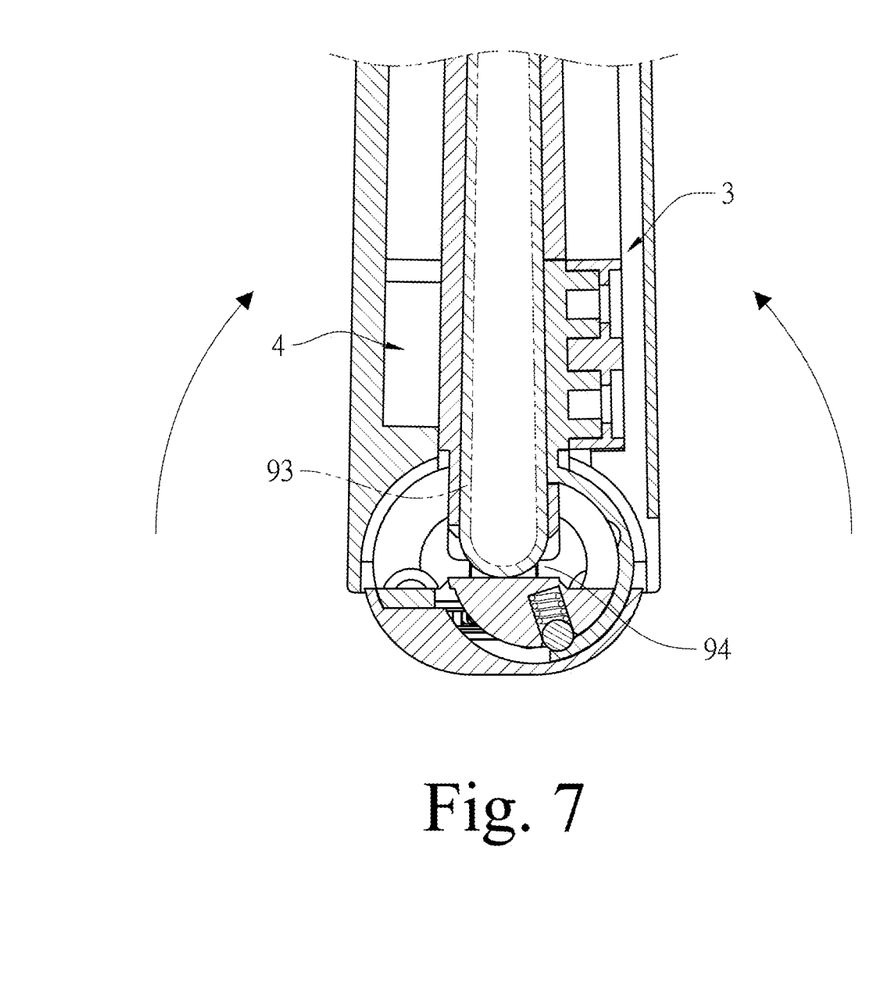
FIG. 7 is a schematic cross-sectional view of the preferred embodiment of the present invention when being folded.
Figure 8:
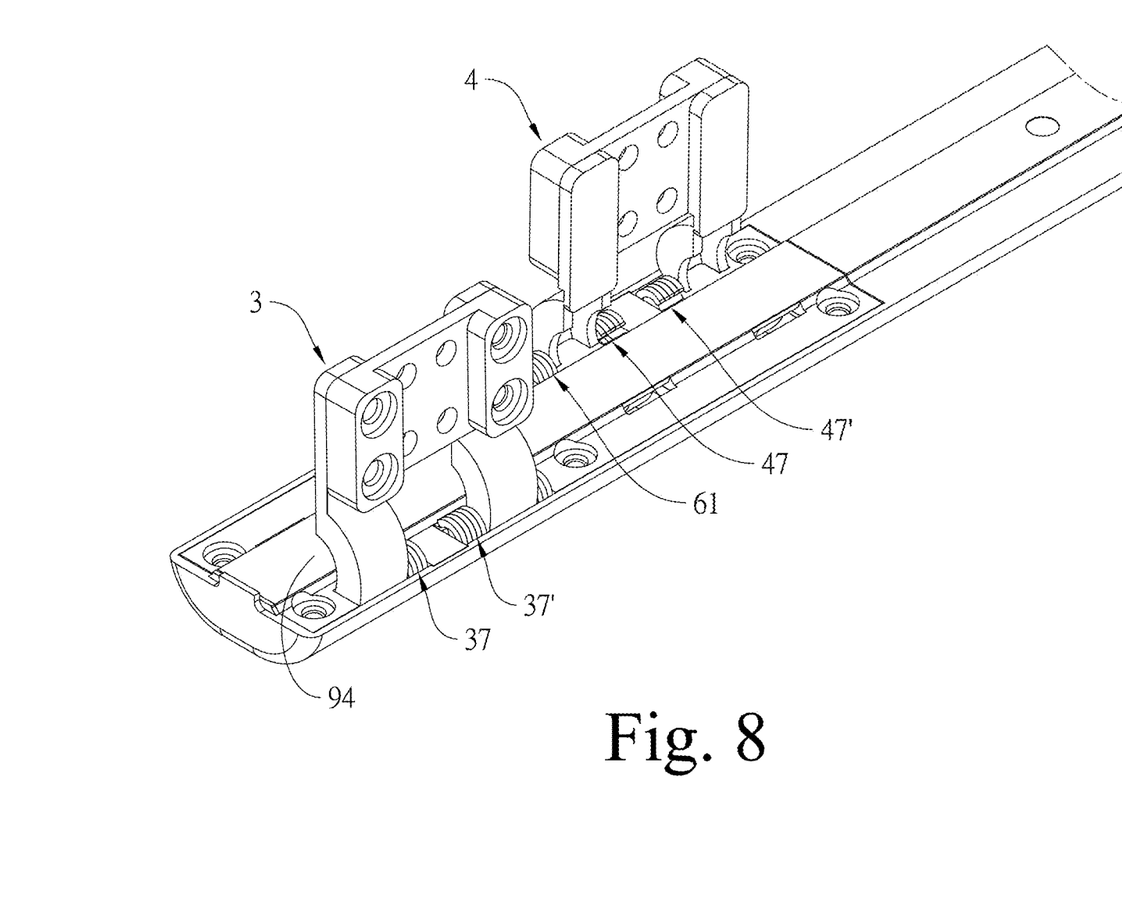
FIG. 8 is a schematic view of the three-dimensional appearance of the preferred embodiment of the present invention when being folded.

The curved body 2 includes a curved base 21 and a cover plate 22. The curved base 21 has two opposite lateral surfaces 211, and the curved base 21 between the two lateral surfaces 211 is provided with a first curved guiding portion 23 and a second curved guiding portion 24 that are juxtaposed and spaced from each other. The first curved guiding portion 23 includes two first curved grooves (231, 231') that are juxtaposed and spaced from each other, and a first track 25 is provided between the two first curved grooves (231, 231'). The second curved guiding portion 24 includes two second curved grooves (241, 241') that are juxtaposed and spaced from each other. A second track 26 is provided between the two second curved grooves (241, 241'). A third track 27 and a fourth track 28 are further provided on the curved base 21 between the first curved guiding portion 23 and the second curved guiding portion 24, and a gear 29 is provided between the third track 27 and the fourth track 28. The cover plate 22 is covered and connected with the top surface of the curved base 21. A plate surface of the cover plate 22 sequentially has a first curved convex portion 221, a first upper track 222, a second curved convex portion 223, a third upper track 224, a fourth upper track 225, a third curved convex portion 226, a second upper track 227, and a fourth curved convex portion 228. The first curved convex portion 221, the second curved convex portion 223, the third curved convex portion 226 and the fourth curved convex portion 228 are respectively accommodated within the first curved groove (231, 231') and the second curved groove (241, 241'). The first upper track 222, the third upper track 224, the fourth upper track 225, and the second upper track 227 are respectively provided opposite to the first track 25, the third track 27, the fourth track 28, and the second track 26. The first curved convex portion 221 and the second curved convex portion 223 are respectively provided with a first accommodation space (2211, 2231), and the third curved convex portion 226 and the fourth curved convex portion 228 are respectively provided with a second accommodation space 2261, 2281).

The first rotating member 3 includes a first connecting portion 31, two first curved block (32, 32'), and a first connecting-lever assembly 33. The first connecting portion 31 includes two first support rods (311, 311') and a first connecting plate 312 respectively connected with one end of each first support rod (311,311'). The first connecting plate 312 is connected with a side of the first support plate 91 of the body (the display) of an electronic device, and another end of each first support rod (311, 311') is respectively extended to form two first curved block (32, 32') that are in parallel and juxtaposed. Taking a first curved block 32 as an example, the first curved block 32 is a curved frame, including two first lateral plates 321 and a first curved plate 322 respectively connected with the two first lateral plates 321. Two first positioning grooves 323 are provided on the inner curved surface of the first curved plate 322. When the first curved block 32 is swingable and limited within the first curved guiding portion 23, a compression spring is accommodated in a first accommodation space 2211 of the first curved convex portion 221. The compression spring is used as a first elastic member 34. The first elastic member 34 has one end pressed against a first positioning ball 35, and the first positioning ball 35 is pressed against the inner curved surface of the first curved plate 322, and the first rotating member 3 is positioned in any of the first positioning grooves 323 at a preset angle by the first positioning ball 35.

The first connecting-lever assembly 33 is connected between the two first curved blocks (32, 32'). The first connecting-lever assembly 33 includes a first sliding block 36 and two first torsion bars (37 37'), and a first upper straight groove 361 and a first lower straight groove 362 are respectively formed on a top surface and a bottom surface of the first sliding block 36, and the first upper straight groove 361 and the first lower straight groove 362 respectively accommodate and limit the first upper track 222 of the cover plate 22 and the first track 25 of the curved base 21. Two first torsion bars (37, 37') are formed by respectively stacking a plurality of torsion pieces, and one end of each first torsion bar (37, 37') is pivotally connected with one side of one first curved block (32, 32'), and another end of each first torsion bar (37, 37') are respectively pivotally connected with both sides of the first sliding block 36, such that when the first rotating member 3 is rotated, the first sliding block 36 is driven by the linkage of the two first torsion bars (37, 37') to be moved on the first upper track 222 and the first track 25.

The second rotating member 4 includes a second connecting portion 41, two second curved blocks (42, 42'), and a second connecting-lever assembly 43. The second connecting portion 41 includes two second support bars (411, 411') and a second connecting plate 412 respectively connected with one end of each two second support bars (411,411'). The second connecting plate 412 is connected with a side of the second support plate 92 of another body (another display or base) of the electronic device, and another end of each second support rod (411, 411') is respectively extended to form two second curved blocks (42, 42') that are in parallel and juxtaposed. Take a second curved block 42 as an example. The second curved block 42 is a curved frame including two second lateral plates 421 and a second curved plate 422 respectively connected with the two second lateral plates 421. Two second positioning grooves 423 are provided on the inner curved surface of the second curved plate 422. When the second curved block 42 is swingable and limited within the second curved guiding portion 24, a compression spring is accommodated in a second accommodation space 2291 of the fourth curved convex portion 228. The compression spring is used as a second elastic member 44. One end of the second elastic member 44 is pressed against a second positioning ball 45, and the second positioning ball 45 is pressed against the inner curved surface of the second curved plate 422 and the second rotating member 4 is positioned in any one of the second positioning grooves 423 at a preset angle by the second positioning ball 45.

The second connecting-lever assembly 43 is connected between two second curved blocks (42, 42'). The second connecting-lever assembly 43 includes a second sliding block 46 and two second torsion bars (47 47'). The top and bottom surfaces of the second sliding block 46 respectively form a second upper straight groove 461 and a second lower straight groove 462, and the second upper straight groove 461 and the second lower straight groove 462 respectively accommodate and limit the second upper track 227 of the cover plate 22 and the second track 26 of the curved base 21. The two second torsion bars (47,47') are formed by respectively stacking a plurality of torsion pieces, and one end of each second torsion bar (47,47') is pivotally connected with one side of one second curved block (42, 42'), and each second torsion bar (47, 47') has another end respectively pivotally connected to both sides of the second sliding block 46, such that when the second rotating member 4 is rotated reverse to the first rotating member 3, the second sliding block 46 is moved on the second upper track 227 and the second track 26 through the linkage of the two second torsion bars (47, 47').

The first linkage assembly 5 includes a first torsion member 51 and a first linkage member 52. The first torsion member 51 is formed by stacking a plurality of torque pieces, and one end of the first torsion member 51 is pivotally connected with a side of the first curved block 32' of the rotating member 3, and another end of the first torsion member 51 is pivotally connected with the first linkage member 52. The first linkage member 52 is a rack. The top and bottom surfaces of the first linkage member 52 respectively form a first upper guiding rail 521 and a first guiding rail 522. The first upper guiding rail 521 and the first guiding rail 522 respectively accommodate and limit the third upper track 224 of the cover plate 22 and the third track 27 of the curved base 21. One side of the first linkage member 52 is engaged with one side of the toothed gear 29.

The structure of the second linkage assembly 6 is the same as that of the first linkage assembly 5, and the second linkage assembly 6 and the first linkage assembly 5 are symmetrical corresponding to both sides of the toothed gear 29 in the reverse direction. One end of the second torsion member 61 of the second linkage assembly 6 is pivotally connected with one side of the second curved block 42' of the second rotating member 4, and another end of the second torsion member 61 is pivotally connected with the second linkage member 62. The second linkage member 62 can be slid on the fourth upper track 225 of the cover plate 22 and the fourth track 28 of the curved base 21 by the second upper track 621 and the second guiding rail 622, and a toothed portion on one side of second linkage member 62 is engaged with another side of the toothed gear 29.

With such arrangement, as shown in FIGS. 2, 3, 7, and 8, in the process in which the two support plates (that is, the display relative to the base or the touch display relative to the other touch display) are folded or unfolded, when the second rotating member 4 is rotated relative to the first rotating member 3, the first linkage member 52 and the second linkage member 62 are driven through the linkage of the first torsion member 51 and the second torsion member 61 to have the first linkage member 52 and the second linkage member 62 respectively moved in a reverse direction on the third track 27 and the fourth track 28 with the gear 29 as a rotation axis. By the torque generated by the rotational friction generated and operated together by the two first torsion bars (37, 37'), the two second torsion bars (47, 47'), a first torsion piece 51 and a second torsion piece 61, such arrangement can make the torque keep stable within the preset range at each rotation angle, and then enable the two juxtaposed support plates that is combined with the display and the base or the dual touch display to be rotated stably, and can stop freely at certain angle when two support plates are rotated. When the two juxtaposed supporting plates are folded, a sufficient accommodating space 94 can be formed for accommodating the curved portion of the flexible display 93 with a small curvature.

Figure 9:
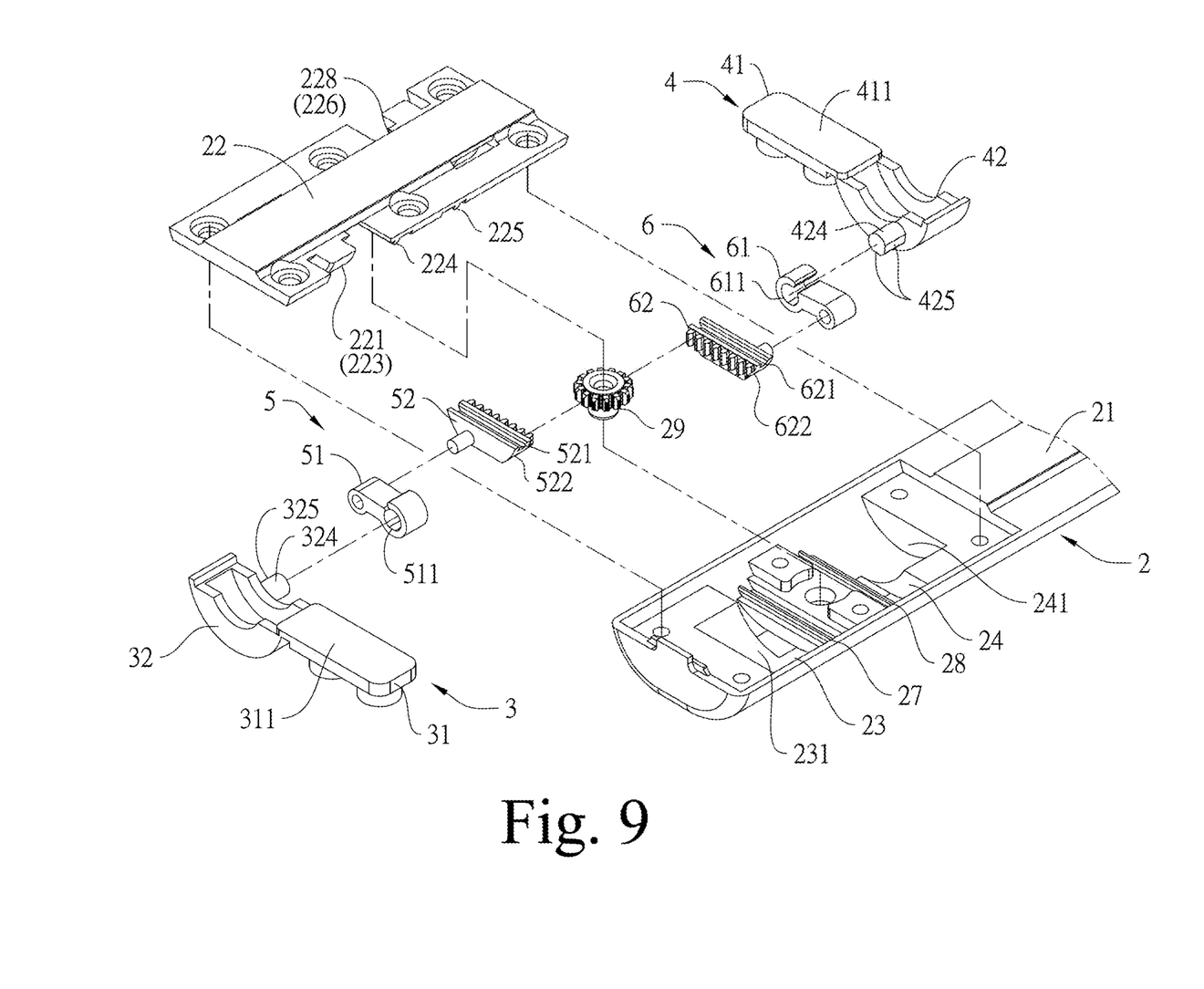
FIG. 9 is an exploded view of a simplified embodiment of the present invention.

In addition, the hinge module of the present invention can further simplify the components to reduce the process and reduce the cost. The simplified embodiment is shown in FIG. 9, in which for the curved base 21 of the curved body 2, in addition to retaining the gear 29, the third track 27 and the fourth track 28, the first curved guiding portion 23 is provided with a curved groove 231, and the second curved guiding portion 24 is provided with a second curved groove 241, and a first curved convex part 221 (or a second curved convex part 223), a third upper track 224, a fourth upper track 225, and a fourth curved convex portion 228 (or a third curved convex portion 226) are sequentially provided on the plate surface of the cover plate 22 of the curved body 2. The first rotating member 3 includes a first support rod 311 of a first connecting portion 31 and a first curved block 32. The first curved block 32 is provided between the first curved convex portion 221 (or the second curved convex portion 223) and a first curved groove 231 to carry out a relatively curved swing. The second rotating member 4 includes a second support rod 411 of a second connecting portion 41 and a second curved block 42, and the second curved block 42 is provided between the fourth curved convex portion 228 (or the third curved convex portion 226) and the second curved groove 241 to carry out a relatively curved swing. The first linkage assembly 5 includes a first torsion member 51 integrally manufactured and a first linkage member 52 used as a rack. The first torsion member 51 has opposite ends pivotally connected with the first curved block 32 and the first linkage member 52 respectively. The first linkage member 52 is engaged with one side of the gear 29, and the third upper track 224 and the third track 27 are respectively accommodated and limited with the first upper track 521 and the first track 522. The second linkage assembly 6 includes a second torsion member 61 that is integrally manufactured and a second linkage member 62 used as a rack. The second torsion member 61 has opposite ends pivotally connected to the second curved block 42 and the second linkage member 62 respectively. The second linkage member 62 is engaged with another side of the gear 29, and the fourth upper track 225 and the fourth track 28 are respectively accommodated and limited with the second upper track 621 and the second track 622.

In the simplified embodiment described above, the first rotating member 3 and the second rotating member 4 as the main rotating elements both have torque and positioning effects, so that they are provided with a first lateral convex shaft 324 and a second lateral convex shaft 424 on one side of the first curved block 32 and one side of the second curved block 42. However, the axial centers of the two lateral convex shafts are not virtual rotation centers of the respective rotating members, and at least one outer plane (325,425) is formed on the peripheries of the first lateral convex shaft 324 and the second lateral convex shaft 424. One end of the first torsion member 51 and one end of the second torsion member 61 are respectively connected pivotally with the first lateral convex shaft 324 and the second lateral convex shaft 424 by a pivot shaft hole, and the inner wall of each pivot shaft hole has an inner plane (511,611), so that each of the inner plane (511,611) correspondingly engages one of the at least one outer plane (325,425) to position each rotating member, and at one end of the first torsion member 51 and one end of the second torsion member 61 are respectively provided with radial opening pivoting shaft holes that are in communication with each other, such that each lateral convex shaft carries out forward and reverse rotation friction in each pivoting shaft hole, thereby producing technical effect of easy opening and heavy closing. The foregoing technical means can also be applied between each rotating member and the torsion bars of each connecting-lever assembly of the preferred embodiments. Since the structures are the same, they will not be described here.

Accordingly, the present invention has the following advantages:

1. The present invention adopts "dual virtual rotation centers" by using two rotating members to rotate synchronously with respect to the curved body to replace the compensation operation generated by the "shaft-free seesaw" structure, and when the two rotating members are folded, the two bodies is not completely folded, while an accommodating space for accommodating the curved portion of the flexible display is still retained. Therefore, such arrangement can effectively simplify the operation of the hinge module, thereby reducing the overall thickness to facilitate the design, so as to meet the market demand of being lighter and thinner to promote sales, and thereby effectively respond to the small curvature limitation of existing flexible displays during the folding process, so as to prolong the service life of flexible displays.

2. When the two rotating members of the present invention are folded relative to each other, each sliding block and each linkage member can be moved on each corresponding track of the curved body. Therefore, such arrangement not only can form a stable multi-point support, but also can have the two rotating members rotated more stably and smoothly.

3. Each torsion bar and each torsion member of the present invention can simultaneously provide frictional torsion and can share the load, such that the two rotating members can be relatively stably rotated, and can be freely stopped at a certain angle during rotation, which can further carries out a torsional changes of light opening and heavy closing and be stopped at a specific angle. Each torsion bar and each torsion member can be made by stacking a plurality of pieces, and can also be manufactured integrally for corresponding implementations in actual situations, thereby increasing the flexibility in use.

4. When the two rotating members of the present invention are folded in a reverse direction, the combination of the outer plane of the lateral convex shaft and the inner plane of the pivoting shaft hole and/or the elastic member and the positioning ball can be used to make the inner and outer planes correspondingly connected with each other; or a positioning ball is provided in each positioning groove. Therefore, such arrangement can produce an effective or more significant positioning effect, so that the two rotating members can be more firmly positioned at a specific angle to be easily used.

The description referred to in the drawings and stated above is only for the preferred embodiments of the present invention. Many equivalent variations and modifications can still be made by those skilled in the field of the present invention without departing from the spirit of the present invention, so they should be regarded to fall into the scope defined by the appended claims.

What is claimed is:

1. A hinge device for a foldable device, comprising:
   a curved body, having two lateral surfaces that are oppositely provided, where a first curved guiding portion and a second curved guiding portion are juxtaposed and spaced from each other between the two lateral surfaces;
   a first rotating member, including a first connecting portion and at least one first curved block, where the first connecting portion is connected with a first support plate; the at least one first curved block is swingable and limited within the first curved guiding portion;
   a second rotating member, including a second connecting portion and at least one second curved block, where the second connecting portion is connected with a second support plate, and the at least one second curved block is swingable and limited within the second curved guiding portion;
   a first linkage assembly, having one end pivotally connected with one side of the first curved block of the first rotating member, and another end of the first linkage assembly being provided with a first linkage member;
   a second linkage assembly, having one end pivotally connected with one side of the second curved block of the second rotating member, and another end of the second linkage assembly is provided with a second linkage member, where the second linkage member is movably connected with the first linkage member in a reverse direction, and
   a gear, provided between the first curved guiding portion and the second curved guiding portion of the curved body, wherein the first linkage assembly includes a first torsion member and a first linkage member; one end of the first torsion member is pivotally connected with one side of the first curved block of the first rotating member, and another end of the first torsion member is pivotally connected with the first linkage member; the first linkage member is a rack, and the first linkage member is engaged with the gear; the second linkage assembly includes a second torsion member and a second linkage member; one end of the second torsion member is pivotally connected with one side of the second curved block of the second rotating member, and another end of the second torsion member is pivotally connected with the second linkage member; the second linkage member is a rack, and the second linkage member is engaged with the gear.

2. The hinge device for the foldable device of claim 1, wherein the first curved guiding portion of the curved body includes two first curved grooves that are juxtaposed and spaced from each other, and the first rotating member has two first curved blocks that are juxtaposed and spaced from each other, and the two first curved blocks are swingable and limited within the two first curved grooves.

3. The hinge device for the foldable device of claim 2, wherein a first track is further provided between the two first curved grooves of the curved body, and a first connecting-lever assembly is further provided between the two first curved blocks of the first rotating member; the first connecting-lever assembly includes a first sliding block and two first torsion bars, and the first sliding block is connected with the first track; each of two first torsion bars has one end pivotally connected with one side of one first curved block, and another end pivotally connected with both sides of the first sliding block, such that the first rotating member is rotated to drive the first sliding block to be moved on the first track.

4. The hinge device for the foldable device of claim 3, wherein the first torsion bar is formed by stacking a plurality of torsion pieces.

5. The hinge device for the foldable device of claim 1, wherein the curved body is further provided with a first accommodating space, and the first accommodating space is for accommodating a first elastic member; one end of the first elastic member is pressed against a first positioning ball; the first positioning ball is pressed against the first curved block for positioning the first rotating member at a preset angle.

6. The hinge device for the foldable device of claim 5, wherein the first curved block is a curved frame including two first lateral plates and a first curved plate respectively connected with the two first lateral plates; at least one first positioning groove is provided on an inner curved surface of the first curved plate for positioning the first positioning ball.

7. The hinge device for the foldable device of claim 1, wherein the second curved guiding portion of the curved body includes two second curved grooves that are juxtaposed and spaced from each other, and the second rotating member has two second curved blocks that are juxtaposed and spaced from each other, and the two second curved blocks are respectively swingable and limited within the two second curved grooves.

8. The hinge device for the foldable device of claim 7, wherein a second track is further provided between the two second curved grooves of the curved body, and a second connecting-lever assembly is further provided between the two second curved blocks of the second rotating member; the second connecting-lever assembly includes a second sliding block and two second torsion bars, and the second sliding block is connected with the second track; each of the two second torsion bars has one end pivotally connected with one side of one second curved block, and each of the two second torsion bars has another end pivotally connected with both sides of the second sliding block, such that the second rotating member is rotated to drive the second sliding block to be moved on the second track.

9. The hinge device for the foldable device of claim 8, wherein the second torsion bar is formed by stacking a plurality of torsion pieces.

10. The hinge device for the foldable device of claim 1, wherein the curved body is further provided with an accommodating space, and the accommodating space is for accommodating an elastic member; one end of the elastic member is pressed against a positioning ball; the positioning ball is pressed against the second curved block for positioning the second rotating member at a preset angle.

11. The hinge device for the foldable device of claim 10, wherein the second curved block is a curved frame including two second lateral plates and a second curved plate respectively connected with the two second lateral plates; at least one second positioning groove is provided on an inner curved surface of the second curved plate for positioning the positioning ball.

12. The hinge device for the foldable device of claim 1, wherein the first torsion member and second torsion member are respectively formed by stacking a plurality of torsion pieces.

13. The hinge device for the foldable device of claim 1, wherein the curved body is further provided with a track, and the second linkage member is further provided with a guiding rail, and the guiding rail is connected with the track, such that the second rotating member is rotated to drive the guiding rail to be movable on the track.

14. The hinge device for the foldable device of claim 1, wherein the curved body is further provided with a third track, and the first linkage member is further provided with a first guiding rail, and the first guiding rail is connected with the third track, such that the first rotating member is rotated to drive the first guiding rail to be movable on the third track.

15. The hinge device for the foldable device of claim 14, wherein the curved body is further provided with a fourth track, and the second linkage member is further provided with a second guiding rail, and the second guiding rail is connected with the fourth track, such that the second rotating member is rotated to drive the second guiding rail to be movable on the fourth track.

* * * * *